United States Patent [19]

Russell

[11] 4,274,855
[45] Jun. 23, 1981

[54] METHOD AND APPARATUS FOR FORMING AND TREATING KINKY FIBERS FROM GLASS

[75] Inventor: Robert G. Russell, Granville, Ohio

[73] Assignee: Owens-Corning Fiberglas Corporation, Toledo, Ohio

[21] Appl. No.: 114,030

[22] Filed: Jan. 21, 1980

[51] Int. Cl.³ .................. C03B 37/02; C03C 25/02
[52] U.S. Cl. .......................... 65/2; 65/3 B; 65/3 C; 65/11 W; 65/12; 264/10; 264/22; 264/168; 264/559; 425/76; 425/174.6
[58] Field of Search ............... 65/2, 3 B, 3 R, 3 C, 65/11 R, 11 W, 12; 264/10, 22, 168, 559; 425/76, 174.6

[56] References Cited

U.S. PATENT DOCUMENTS

| | | | |
|---|---|---|---|
| 2,708,813 | 5/1955 | Bourgeaux | 65/2 |
| 3,063,094 | 11/1962 | Warthen | 65/12 |
| 3,775,074 | 11/1973 | Russell | 65/2 |
| 3,830,638 | 8/1974 | Jumentier et al. | 65/3 C |
| 4,145,199 | 3/1979 | Russell | 65/2 |
| 4,148,595 | 4/1979 | Bednarz | 264/22 X |

FOREIGN PATENT DOCUMENTS 973740 8/1956 Fed. Rep. of Germany ............ 65/3 R
1669586 5/1971 Fed. Rep. of Germany ............ 65/3 B Primary Examiner—Robert L. Lindsay, Jr.
Attorney, Agent, or Firm—Ronald C. Hudgens; Philip R. Cloutier; Kenneth H. Wetmore

[57] ABSTRACT

The disclosure embraces a method of and apparatus for processing heat-softenable materials, such as glass, to form fibers or filaments from the streams of material and more particularly effecting successive distortions, oscillations or vibrations of the streams of glass by directing streams or jets of liquid for cooling or quenching the streams of glass at the region of formation of the fibers or filaments for establishing successive kinks, bends or crimps in the attenuated fibers or filaments, and delivering or conveying by the quenching streams of liquid or other streams of liquid powdered or particulate materials or metals for combining with, coating or reacting with the glass of the streams at the region of formation of the fibers or filaments for producing combined metal and glass fibers or filaments or coating the glass fibers or filaments with metals or other materials and utilizing electric current potential applied to the streams of liquid entraining metal or other particulate materials for establishing micro arcs whereby kinky fibers or filaments are produced having roughened or pitted surfaces of imparting other characteristics to the fibers or filaments.

14 Claims, 13 Drawing Figures

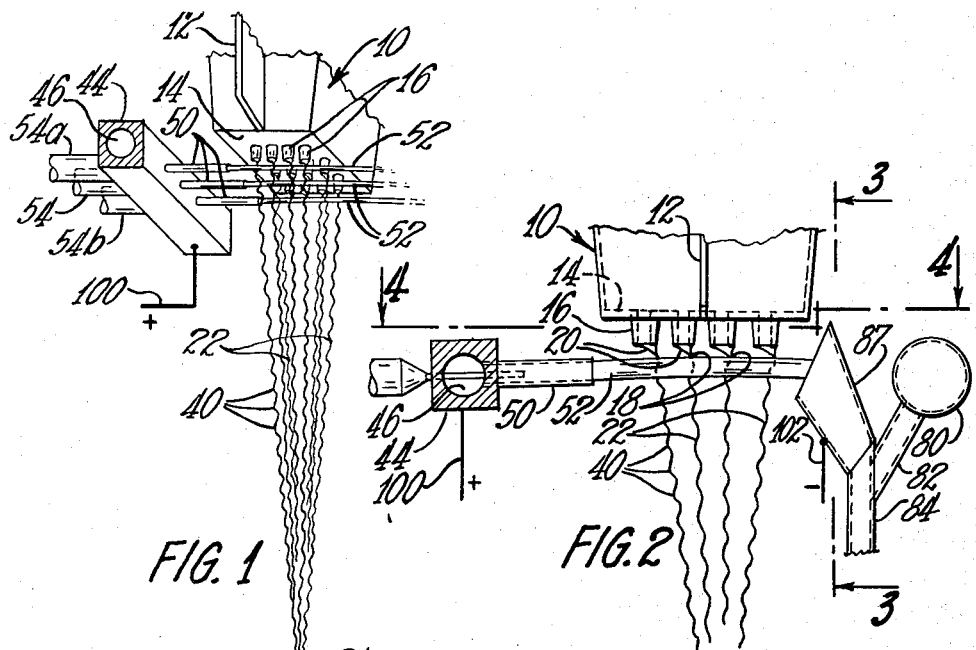
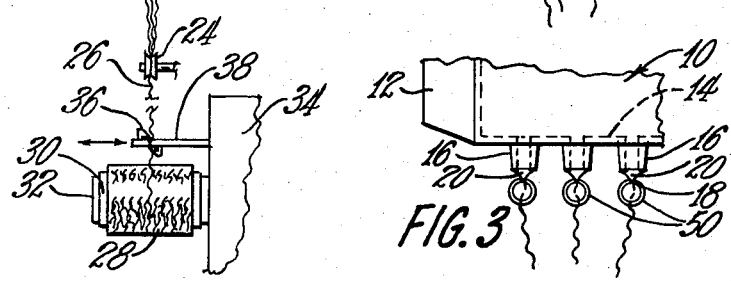
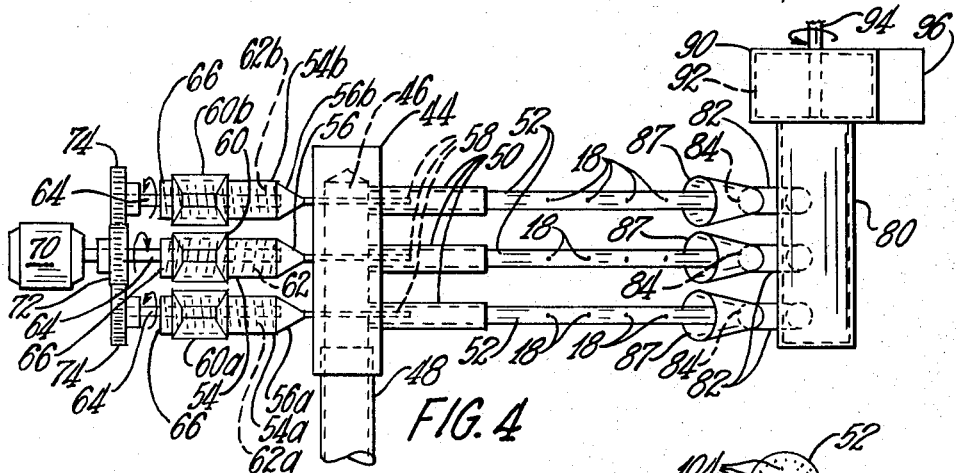
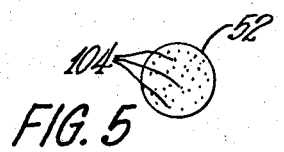

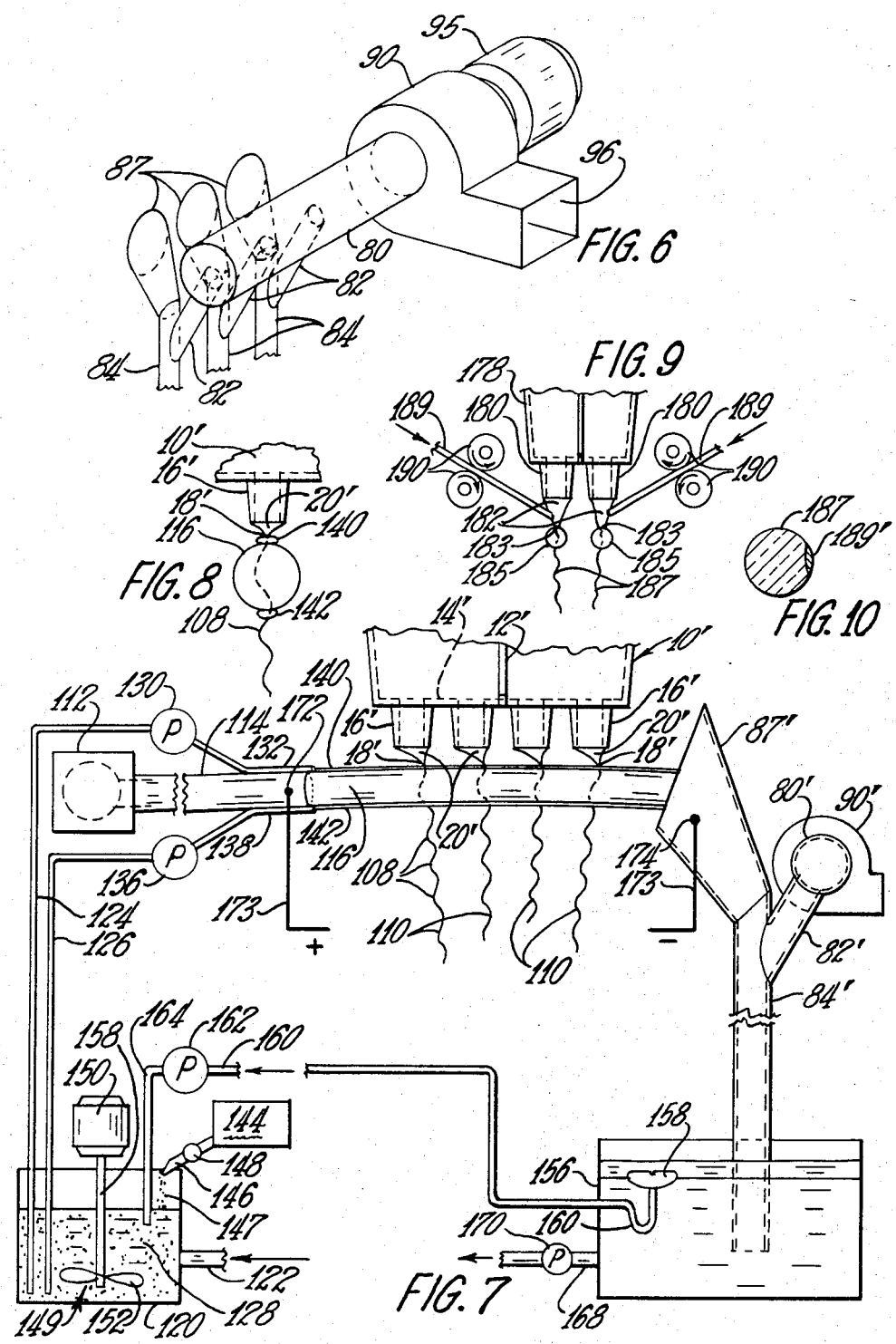

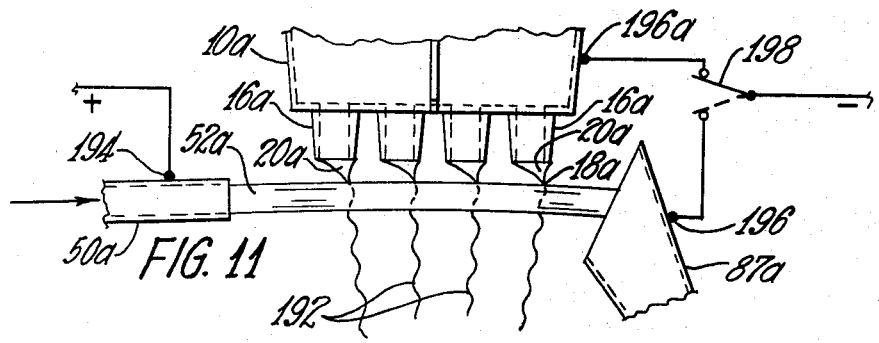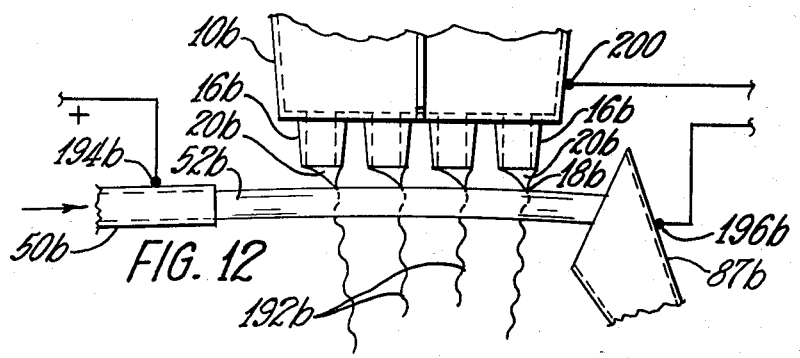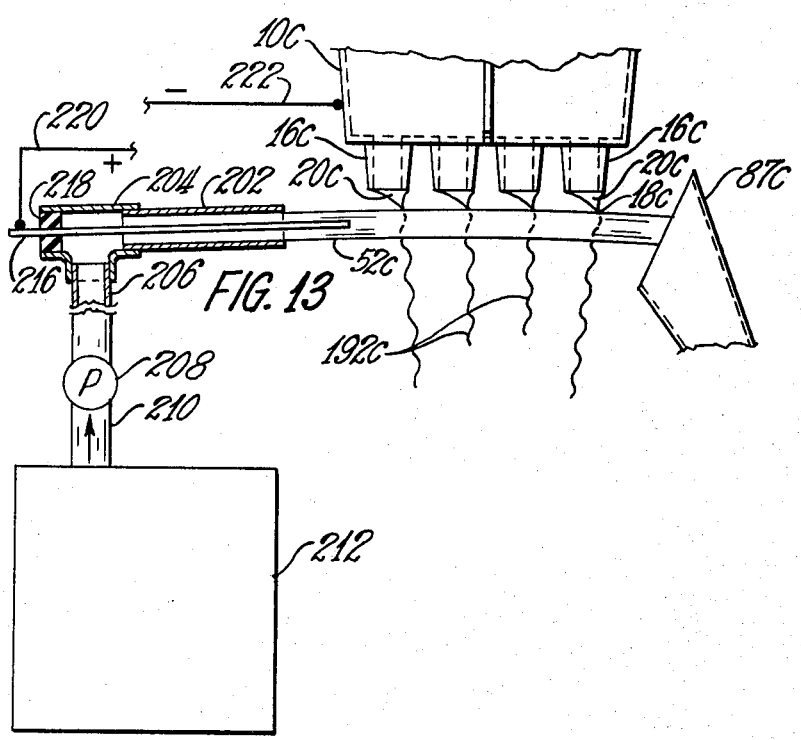

METHOD AND APPARATUS FOR FORMING AND TREATING KINKY FIBERS FROM GLASS

TECHNICAL FIELD

This invention relates to forming and processing fibers or filaments of glass wherein fine streams of heat-softened glass are engaged by forces to attenuate and form the glass streams into fibers or filaments having kinks, bends or crimps therein and for treating or processing the fibers or filaments during formation to impart various characteristics to the fibers or filaments, or coating or combining the fibers or filaments with metals.

BACKGROUND ART

The art of forming glass fibers by attenuating streams of heat-softened glass to fibers has been known for many years and continuous fibers or filaments of glass are formed by attenuating the fibers or filaments by engaging them with a rotating instrumentality such as a pull wheel or by winding a strand of the fibers or filaments upon a spool or other rotating body. Various treatments have been applied to fibers or filaments to provide coatings on the fibers or filaments for various purposes or processing the fibers or filaments to impart a roughened surface or other specific characteristics to the fibers or filaments.

More recently fibers or filaments have been made embodying successive kinks, crimps or bends in the attenuated fibers or filaments through the use of a cooling or quenching fluid engaged with the tip regions of the cones of glass streams during their attenuation to the fibers or filaments. A known method and apparatus for forming fibers or filaments of glass with kinks, bends or crimps in the attenuated fibers or filaments are described in U.S. Pat. Nos. 4,050,916 and 4,145,199.

DISCLOSURE OF THE INVENTION

The present invention involves a method of and apparatus for processing heat-softenable fiber-forming materials, such as glass, ceramic, or the like, to form attenuated fibers or filaments from streams of glass and effecting successive distortions, oscillations, or vibrations of the streams of glass by directing streams or jets of liquid for cooling or quenching the streams of glass at the region of formation of the fibers or filaments at a rate for establishing permanent kinks, bends or crimps in the attenuated fibers or filaments wherein particulate or flowable materials are conveyed by the quenching medium into contact with streams of glass or other fiber-forming material.

The jets or streams of quenching liquid may be utilized to deliver or convey powdered or comminuted materials, metals or other liquids for combining with or reacting with the glass of the streams at the region of formation of the fibers or filaments for imparting roughened surfaces of the fibers or filaments, or for producing composite metal and glass fibers, or coating the glass fibers with metals or other materials.

The invention is inclusive of a method and apparatus utilizing electric current potential applied to the quenching streams of liquid wherein carbon particles provide a fluidized bed or jet in which may be entrained materials for effecting micro arcs among the carbon particles or metal particles for producing roughened or pitted surfaces on the kinky fibers or filaments. Materials may be added to the streams of quenching liquid which may be volatilized by the heat from the glass streams for coating the fibers with such materials or to react with the glass fibers.

The liquid of the quenching streams may be utilized for conveying rider streams of other liquids for conducting materials, such as powdered metals, plastic powders and the like, to the glass streams at the attenuating region into contact with the fibers or filaments at the attenuating region.

An electric potential may be established in the cooling or quenching streams reacting with the materials for imparting particular characteristics to the attenuated filaments or fibers or for plating the fibers or filaments. Metal in powdered form may be conveyed by the quenching streams or jets to the hot streams of glass, or metal in ribbon formation may be fed into the hot glass cones of the glass stream to produce a partial metal coating on kinky fibers or produce composite kinky fibers of glass and metal.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of my invention will be described in connection with the accompanying drawings in which:

FIG. 1 is a schematic isometric view of an arrangement for attenuating streams of glass to fibers or filaments having kinks or bends therein by quenching the fibers or filaments by streams of liquid wherein the quenching streams of liquid convey powdered or comminuted materials into contact with the streams of glass at the attenuating regions;

FIG. 2 is an elevational view of the arrangement shown in FIG. 1 illustrating the engagement of the streams of quenching liquid with streams of glass for forming kinks or bends in the fibers or filaments attenuated from the glass streams, the liquid streams entraining materials for contact with the streams of glass;

FIG. 3 is a fragmentary elevational view of the stream feeder and nozzles from which streams of quenching liquid are delivered into contact with the streams of glass;

FIG. 4 is a top plan view of the arrangement illustrated in FIG. 2 additionally showing means for feeding materials into the streams of quenching liquid for contact with the glass streams;

FIG. 5 is a cross section of a stream of quenching liquid for engagement with the glass streams illustrating particles of materials entrained in the stream of liquid;

FIG. 6 is a schematic isometric view of an arrangement for recovering the liquid of the quenching streams;

FIG. 7 is an elevational view similar to FIG. 2 and additionally illustrating means for delivering flowable materials onto the streams of quenching liquid for contact with the glass streams at the region of attenuation of the glass streams to fibers or filaments;

FIG. 8 is an end view of a stream of quenching liquid shown in FIG. 7 with rider streams of flowable material entrained and converted by the stream of quenching liquid;

FIG. 9 illustrates an arrangement for feeding heat-softenable metals or other materials into the cones of glass of the glass streams in advance of engagement of streams of quenching liquid with the glass streams;

FIG. 10 is a greatly enlarged cross sectional view of a fiber or filament of glass illustrating a deposit of metal on the fiber or filament by the arrangement shown in FIG. 9;

FIG. 11 is an elevational view illustrating a liquid quenching stream containing current conducting particles with an electric current potential established in the liquid quenching stream;

FIG. 12 is a view similar to FIG. 11 illustrating a modified circuit for establishing electric current potential in the quenching liquid stream, and FIG. 13 is a view similar to FIG. 12 wherein the quenching stream contains a metal salt and the anode of the electrical circuit in the quenching stream is insulated from a nonmetallic delivery nozzle for the quenching stream and wherein the glass streams become cathodes whereby a plating of metal may be formed on the fiber or filament.

BEST MODE FOR CARRYING OUT THE INVENTION

Referring to the drawings in detail and initially to FIGS. 1 through 4 and 6, a form of apparatus is illustrated for processing heat-softened fiber-forming material, such as heat-softened glass or ceramic composition, into fibers or filaments having successive permanent kinks, bends or crimps formed therein under the influence of streams of quenching liquid. Materials may be entrained in the streams of quenching liquid for contact or reaction with the glass streams at the fiber or filament attenuating region at the tips of the cones of glass streams emanating or flowing from a stream feeder.

The arrangement is inclusive of a stream feeder or bushing 10 adapted to contain heat-softened fiber-forming material such as glass. Where the fiber-forming material employed is glass, the stream feeder is fashioned of a material such as an alloy of platinum and rhodium or other material which is resistant to high temperatures of molten glass.

The end walls of the feeder 10 have terminal lugs 12 connected with a supply of electric current for heating the glass, one of the lugs 12 being shown in FIGS. 1, 2 and 3. Alternating current of comparatively low voltage in a range of one and one half to five or more volts and of high amperage is utilized for maintaining the glass in the stream feeder in a molten or flowable condition.

The stream feeder 10 may be connected with the forehearth of a glass melting furnace (not shown) and supplied with molten glass from the furnace, or the stream feeder or bushing 10 may be of a character which receives pieces or spherical bodies of prerefined glass reduced to a molten condition by electric energy passing through the stream feeder or bushing.

The flow of electric energy through the stream feeder 10 is controlled to maintain the glass or other heat-softened fiber-forming material at a desired temperature and viscosity at which streams of the glass of uniform characteristics may be flowed from the feeder.

The feeder floor 14 is preferably fashioned with rows of depending projections 16 disposed transversely of the feeder, as shown in FIG. 1, each projection having a flow passage or orifice therein through which a stream 18 of the heat-softened glass or fiber-forming material is flowed from the feeder. While three rows of projections 16 are illustrated in FIG. 1, it is to be understood that there may be a larger number of depending orificed projections in both the transverse and longitudinal rows.

Each glass stream at the region of its exit from a projection or tip 16 is in the form of a cone 20. Each of the glass streams is attenuated to a fiber or continuous filament 22, the fibers or filaments 22 being converged by a member or gathering shoe 24 into a linear group, strand or bundle 26.

In the embodiment illustrated in FIG. 1, the strand 26 is wound into a package 28 on a collector tube or sleeve 30 telescoped onto a collet or mandrel 32 of a winding machine 34. The mandrel and collector tube are rotated by a motor (not shown) in a conventional manner. The winding of the strand on the package attenuates the glass streams 18 to the fibers or filaments 22.

A rotatable traverse means 36 is mounted on a rotatable bar or member 38 which is also reciprocable lengthwise of the collet 32. The rotating traverse means 36 effects a crossing of the convolutions of strand in the package and the reciprocation of the bar 38 distributes the strand 26 lengthwise on the package in a conventional manner. Other conventional methods or means may be employed for attenuating the streams of glass to fibers or filaments.

The arrangement is inclusive of means for impinging streams or jets 52 of liquid, such as water or a foam material, against the glass streams at or adjacent the tip regions of the cones for effecting or establishing distortions, vibrations, oscillations, or relative lateral movements of the softened glass, and cooling or quenching the streams of glass by the streams or jets 52 of liquid thereby forming successive kinks, bends or undulations 40 in the fibers or filaments.

The invention embraces a method and means of delivering various materials into contact with the heat-softened glass of the streams or cones for combining with, reacting with or coating the glass of the streams at the region of formation of kinky fibers or filaments for producing composite glass-metal fibers or filaments or reacting with the glass to modify the characteristics of the fibers or filaments such as forming roughened or pitted surfaces on the fibers or filaments or for combining materials with the glass for other purposes.

Metal or current-conducting particles may be entrained in the jets or streams 52 of quenching liquid in conjunction with electric current potential of a character for effecting micro arcing between adjacent particles for combining the metal or other particles with the glass or effecting pitting or roughening of the surfaces of the glass fibers or filaments or otherwise modifying characteristics of the fibers or filaments.

One embodiment of means for entraining materials in fine powder or particulate form in the quenching streams 52 for delivery into contact with the glass streams and providing electric current potential where the fine powder or particulate materials are of metal or carbon is illustrated in FIGS. 1 through 4. Disposed lengthwise of the stream feeder 10 is a manifold or member 44 having a hollow interior 46 which is supplied with a quenching fluid such as water under pressure from a supply (not shown) through a pipe 48. Disposed lengthwise of the manifold 44 in spaced relation are tubes, pipes or tubular nozzles 50.

Each of the nozzles 50 is aligned with a transverse row of glass streams 18. While FIGS. 1 and 3 illustrate three transverse rows of depending orificed projections 16 with four projections in each row, the stream feeder may be provided with a larger number of transverse rows of orificed projections and each row may have more than four projections depending upon the size of the stream feeder.

The manifold 44 conveys the quenching or cooling medium, such as water, to each nozzle or pipe 50 and as the quenching medium is under pressure, the quenching medium is projected as a coherent stream 52 of the quenching medium from each of the tubes or nozzles 50. While water is preferred as a quenching medium for the streams of glass, foam material or other suitable liquid may be used.

It is essential that the streams 52 of water or other quenching medium be of sufficient velocity so that the streams 52 of quenching medium impinge against the glass streams at or adjacent the tips of the cones 20 to distort, vibrate or oscillate the glass streams as shown in FIGS. 1, 2 and 3 from their otherwise normal vertical paths or descent from the orifices in the projections 16 of the stream feeder. The size or diameter of the streams of water or other quenching fluid must be adequate to impinge against all of the glass streams of a row.

It is found that water under pressure of from thirty pounds per square inch to about sixty pounds per square inch will provide a coherent stream of water of sufficient velocity to engage the glass streams of a row and that each stream of water has substantially a rectilinear coherent trajectory with a minimum of curvature as illustrated in FIG. 2. If the pressure of the water or quenching medium is too high, then the velocity impact of the water or the quenching streams against the glass streams tends to tear or break the glass streams and glass beads tend to form.

The streams 18 of glass of a row are aligned whereby the fibers or filaments as they are attenuated are drawn through the central region of a stream of water as illustrated in FIGS. 3 and 4. The streams of quenching medium, such as water, engaging the tip regions of the cones 20 of the glass streams 18, cause substantially continuous distortions, oscillations, vibrations or lateral movements of the glass streams and concomitant quenching or cooling of the fibers or filaments solidifies the successive distortions, oscillations or vibrations as permanent bends, kinks or undulations in the attenuated fibers or filaments. This method of forming kinks, bends, or undulations in fibers or filaments is described in Russell U.S. Pat. No. 4,050,916.

The arrangement illustrated in FIGS. 1, 2 and 4 embodies means for delivering materials in fine powder or particulate form by the streams 52 of quenching liquid into contact with the glass of the streams 18 at the region of engagement of the quenching streams 52 with the glass streams 18 at the tip regions of the cones of glass.

The particulate materials engaging the glass of the streams may be for the purpose of forming a composite fiber or filament of the glass and the particulate material, or for coating the fiber or filament or otherwise reacting with the glass to impart or modify particular characteristics of the surfaces of the glass fibers or filaments.

The arrangement ilustrated in FIGS. 1, 2 and 4 is particularly suited for entraining powdered materials, carbon particles or fine metal particulates in the streams 52 of quenching medium or water and conveyed by the streams into contact with the glass of the glass streams 18.

The arrangement is inclusive of a circuit for establishing an electrical potential whereby micro arcing occurs between adjacent particles of metal to promote adherence of the particles of metal to the glass to form a composite glass-metal fiber or filament or to form roughened or pitted surfaces on the fibers or filaments as they are acted upon by the streams of quenching medium.

Where carbon particles are entrained in the quenching streams provided with an electrical potential, micro arcing occurs between adjacent carbon particles causing roughness or pitting of the surfaces of the glass fibers or filaments.

Disposed adjacent the manifold 44 are tubular members 54, 54a and 54b having converging cone-shaped end regions 56, 56a and 56b, concerned with tubular means 58 which are of very small diameter approximating that of a hypodermic needle. Each of the tubular members 54, 54a and 54b are connected respectively with supply hoppers or containers 60, 60a and 60b which are adapted to contain particulate materials or fine powdered materials for delivery by the quenching streams 52 into contact with the glass streams 18.

While FIGS. 1 through 4 illustrate an arrangement for delivering three coherent streams of quenching liquid, it is to be understood that a more or less number of streams may be utilized depending upon the number of rows of glass streams flowing from the stream feeder.

Means is provided associated with the tubular members 54, 54a and 54b for feeding particulate materials or fine powdered materials from containers 60, 60a and 60b into the small diameter tubular members 58 for delivery into the streams 52 of quenching medium exiting from the nozzles 50. Disposed in the tubular or hollow members 54, 54a and 54b are rotatable members or elements 62, 62a and 62b having spiral vanes mounted on shafts 64, the shafts being journally supported in fluid tight bearings contained in end closures 66 for the tubular members 54, 54a and 54b.

Means are provided for concomitantly rotating the members 62, 62a and 62b. The central shaft 64 is driven by motive means such as an electrically energizable motor 70. The central shaft 64 mounting the screw-like member 62 is provided with a drive gear 72 which is enmeshed with gears 74 for driving the shafts equipped with the spiral vaned members 62a and 62b.

The spiral vanes of members 62, 62a and 62b are slanted in a direction so that rotation of these members feed the particulate materials or fine powdered materials from the containers 60, 60a and 60b in a right-hand direction, as viewed in FIG. 4, through the tubular members 54, 54a and 54b to extrude the particulate materials or fine powdered metals through the hypodermic needle-like members 58 into the quenching liquid moving through the nozzles 50. The particulate or powdered materials or metals in the streams of quenching medium, in effect, provide fluidized beds or jets of the materials.

Means is provided for conveying away the spent liquid of the quenching streams 52 as well as any particulate materials remaining in the quenching streams for the purpose of reclaiming the liquid of the streams as well as to prevent contamination of the environment by fugitive particulate materials. FIGS. 2, 4 and 6 illustrate one arrangement for conveying away the spent quenching liquid and any particulate materials remaining in the quenching streams.

Disposed lengthwise of the stream feeder 10 is a hollow or tubular manifold 80. Arranged lengthwise of the manifold 80 are tubular members 82 which are connected with vertically disposed tubular members 84. Each of the vertical members 84 has a funnel-like entrance member 87 having its outwardly flared end region in alignment with a quenching stream 52 whereby the spent liquid of the stream is delivered into the funnel-like portions 87 and the collected liquid and particulate metals or powdered materials therein conveyed away by the tubes 84 for reuse.

As particularly shown in FIG. 6, the manifold 80 is provided at one end with a suction blower 90 in which is rotatably mounted a suction blower member 92 upon a rotatable shaft 94 driven by an electric motor 94 or other means. The suction blower 90 has an exit region 96 which, if desired, may be connected with a filter means for filtering out particulate materials which may escape from the quenching streams 52.

The suction blower 90 exerts suction or subatmospheric pressures in the funnel-like members 87 to assure that particulate materials adjacent the quenching streams are ensnared by the filter means (not shown) so as not to cause contamination of the environment.

Various particulate or powdered materials may be fed to the quenching streams 52 depending upon the end results desired for or reactions with the kinky or crimped fibers or filaments. With the use of metals in particulate form or carbon particles an electric circuit may be provided to effect a reaction of the particulate materials on the fibers or filaments or for providing a coating of metal on the fibers or filaments or otherwise reacting with the fibers or filaments to form pitted or roughened surfaces on the fibers or filaments or for other purposes.

One terminal of the circuit, for example the positive terminal 100 shown in FIG. 2, may be connected with the metal manifold 44 and the negative terminal 102 connected with the funnel-like members 87 whereby an electrical potential is established in the liquid of the quenching streams. Where the quenching streams contain particles of carbon the electrical potential promotes micro arcing between the adjacent carbon particles and this arcing tends to form a pitted or roughened surface on the fibers or filaments.

The electrical potential set up in the quenching streams is direct current of a voltage of up to about twenty four volts which is usually sufficient to cause micro arcing between adjacent carbon particles. While current for establishing the electrical potential is preferably direct current it is to be understood that alternating current may be used to establish the potential.

The current supplied to the stream feeder or bushing 10 through the terminal lugs 12 is preferably alternating current of low voltage, for example one half volt to five volts or more, for maintaining the molten glass in the feeder or bushing at a proper temperature and viscosity for flowing streams of glass through the orificed projections 16. The micro arcing provides some additional heat which tends to cause pitting or roughness of the surfaces of the kinky fibers or filaments being formed.

Carbon particles may be delivered onto the quenching streams by the small tubular members 58 through the arrangement illustrated in FIG. 4. Metals in finely divided or powdered form may be supplied to the hoppers 60, 60a and 60b and delivered into the quenching streams to also affect the fibers or filaments by a roughened or pitting of the surfaces, or the metal powders may be utilized as a coating on the fibers or filaments.

The powdered metals in the quenching streams under the influence of the electrical potential in the streams may be fused into the fibers or filaments. For example, particles of metals, such as tin, chromium, nickel, silver, cadmium, titanium, boron and the like, or compounds thereof may be utilized. The metal particles may be reduced to molten condition by the heat of the glass cones and the heat of the micro arcs to form metal coatings on the fibers or filaments.

FIG. 5 illustrates particles 104 of particulate materials entrained in a stream 52 of quenching liquid. The particles 104 may be of various metals and where powdered metals are employed, electrical potential is utilized as hereinbefore pointed out. The invention embraces the use of nonmetallic powdered materials such as resinous or plastic materials, for example, acrylics, polyesters, polyvinyls in fine powder form, may be delivered into the streams of quenching media through the arrangement illustrated in FIG. 4 or by other suitable means whereby the plastic powder is deposited upon the glass fibers or filaments forming a composite fiber or filament.

The plastic powder may be fused under the influence of heat from the intensely hot cones 20 of glass to form a coating or a partial coating on the glass fibers or filaments. Where it is desired to utilize powders or particulates of plastic or resinous materials an electrical potential is rendered unnecessary.

While the stream feeder or bushing is preferably made of an alloy of platinum such as platinum and rhodium, it is to be understood that the stream feeder or bushing may be fashioned of other metal compositions, for example, Inconel metal which is an alloy or composition containing about 78% nickel and small amounts of copper, iron, manganese, silicon and carbon, this alloy having a high resistance to heat and may be used for containing most glass compositions in a molten state such as those used for forming fibers or filaments.

The operation of the arrangement shown in FIGS. 1 through 4 and .6 where powdered resinous or plastic material is entrained in the quenching streams or media is as follows: The glass streams 18 flowing from the stream feeder are attenuated to fibers or filaments by winding a strand 26 of the fibers or filaments into a package 28 on a forming tube mounted on the rotating mandrel or collet 32. The fluid or liquid providing the quenching streams 52 in the interior 46 of the manifold 44 is under pressure and the streams 52 extruded from the nozzles 50 engage the glass streams 18 at or adjacent the apex regions of the cones 20 of the glass streams 18.

A resinous or plastic material in fine powder or particulate form is fed from the containers or hoppers 60, 60a and 60b by rotation of the members 62, 62a and 62b through the small diameter tubes 58 into the quenching liquid flowing through each of the nozzles 50. In this manner the powdered material is entrained in the quenching streams 52 and conveyed thereby into contact with the glass streams at the region of the tips of the cones of glass. The plastic material may adhere to the glass streams 18 as they are attenuated or formed into kinky fibers or filaments providing composite fibers or filaments of glass and plastic material.

The velocity of the quenching streams 52 of liquid is sufficient to effect substantially uniform quenching of the glass streams to form kinks or bends 40 in the fibers or filaments 22. Under the influence of reduced or subatmospheric pressure established in the funnel-shaped members 87 by rotation of the blower rotor 92 the spent liquid of the streams is conveyed away through the tubular members 84 together with any residual plastic material in the quenching liquid. Through the use of the suction blower and filter means contamination of the environment is prevented.

In the operation of the arrangement shown in FIGS. 1 through 4 and 6 where metals in fine powder or particulate form are delivered from containers or hoppers 60, 60a and 60b into the quenching streams 52, an electrical potential or circuit may be established between the current conductor or terminal 100 connected with the manifold 44 and the conductor or terminal 102 connected with the funnel-shaped members 87 whereby micro arcs may occur between adjacent metal particles in the quenching streams.

Such micro arcing between the metal particles in the regions of the glass streams 18 causes a pitting or roughness in the surfaces of the kinky fibers or filaments attenuated from the glass streams. The reduced or subatmospheric pressure in the funnel-shaped members 87 conveys away any metal particles remaining in the quenching streams or any metal particles adjacent the quenching streams.

The pitting or roughening of the surfaces of the fibers or filaments has been found to increase the flexibility of the fibers or filaments. When the kinky fibers or filaments are grouped into bundles or strands they are resistant to abrasion as the interengaged fibers or filaments tend to adhere or interlock one with another to a greater extent than when the surfaces of the fibers or filaments are of smooth character.

FIGS. 7 and 8 illustrate the method and apparatus of the invention wherein a "rider" stream or streams of liquid which are immiscible with the water or liquid of the quenching streams or jets are contiguous with and move along with or are conveyed by the quenching streams into contact with the fibers or filaments of glass at or adjacent the regions of attenuation.

The "rider" stream or streams may be of oil or other liquid immiscible with water, or the "rider" stream may be a silicon coupling agent or the like. A "rider" stream may be contiguous with a quenching water stream on top of the water and, if desired, a "rider" stream may be contiguous with the lower surface of a quenching water stream.

FIGS. 7 and 8 illustrate a "rider" stream both above and below each quenching water stream. Powdered metals, plastic powders or other particulate materials may be conveyed by the "rider" stream or streams into contact with the glass fibers or filaments at their region of attenuation.

As illustrated in FIG. 7, a stream feeder or bushing 10' is adapted to contain heat-softened glass or other heat-softened fiber-forming material, the stream feeder being fashioned of high temperature resistant material which may be an alloy of platinum or rhodium or other suitable material. The end walls of the feeder 10' have terminal lugs 12', one of which is shown in FIG. 7, connected with a supply of electric energy for heating the glass. The electric energy may be alternating current of comparatively low voltage and high amperage for maintaining the molten glass in the stream feeder at a proper attenuating temperature and viscosity.

The stream feeder 10' may be connected with a forehearth of a glass melting furnace (not shown) or the stream feeder or bushing 10' may receive pieces or bodies of prerefined glass which are reduced to a molten condition by electric energy passing through the stream feeder or bushing.

The feeder floor 14' is preferably fashioned with rows of depending projections 16' disposed transversely of the feeder 10', each projection having a passage or orifice through which flows a stream 18' of heat-softened glass or other fiber-forming material. The forms of the molten glass of the streams 18' at the terminals of the orificed projections 16' are in the shape of cones 20'. While FIG. 7 illustrates a transverse row of four orificed projections 16', there may be several transverse rows as illustrated in FIGS. 1 and 3. There may be more than four orificed projections in each of the several transverse rows.

Each of the glass streams 18' is attenuated to a kinky fiber or filament 110, the fibers or filaments being converged by a gathering shoe into a linear group, strand or bundle as shown in FIG. 1 wherein the strand is wound into a package onto a rotating collet or mandrel during the winding operation. A rotatable and reciprocable transverse means, such as shown at 36 in FIG. 1, effects a crossing of the convolutions of the strand or bundle and distributes the strand or bundle lengthwise on the package.

The arrangement shown in FIG. 7 is inclusive of means for impinging a stream or jet of liquid, such as water or other liquid, against the glass streams of each transverse row of glass streams at or adjacent the tip regions of the cones or attenuating regions for establishing distortions, vibrations or oscillations of the softened glass for cooling or quenching the streams of glass under the influence of the streams or jets of water or other liquid whereby forming successive kinks, bends or undulations 108 in the fibers or filaments 110.

The arrangement illustrated in FIG. 7 includes a method of and means for delivering various materials into contact with the streams 18' of the heat-softened glass by entraining the materials in one or more "rider" streams of liquid contiguous to and moving with the streams of water or liquid for quenching or cooling the glass streams during attenuation.

The materials conveyed by the "rider" streams may combine with, coat or react with the glass of the streams at the region of formation of kinky fibers or filaments for imparting particular characteristics to the kinky fibers or filaments such as forming roughened or pitted surfaces on the fibers or filaments or combining the entrained materials with the glass of the streams for various purposes.

Disposed lengthwise of the stream feeder 10' is a manifold 112 similar to the manifold 44 shown in FIG. 1 which is supplied with a quenching fluid, such as water or other liquid under pressure, from a supply (not shown). Disposed lengthwise of the manifold 112 in spaced relation and connected thereto are tubes, pipes or tubular nozzles 114, there being a nozzle aligned with each transverse row of glass streams 18'. Each of the nozzles 114 delivers a coherent stream or jet 116 of quenching or cooling fluid, such as water, at a substantial velocity.

While a preferred quenching or cooling medium is water, it is to be understood that other fluids or foam material may be used. The quenching streams or jets 116 are of sufficient velocity so that the streams or jets of quenching fluid impinge against the glass streams 18' at or adjacent the tips of the cones 20' of glass to distort, vibrate or oscillate the glass streams from their normal vertical paths of descent from the orifices in the projections 16' depending from the stream feeder 10' to form kinks, bends or undulations in the fibers or filaments.

It is essential that the jets or streams 116 of quenching fluid have a velocity to provide streams having rectilinear coherent trajectories with a minimum of curvature to properly engage the glass streams of transverse rows of glass streams. Each quenching stream or jet is preferably under pressure of from thirty pounds per square inch to about sixty pounds per square inch providing sufficient velocity to form streams of rectilinear trajectory.

The apparatus is inclusive of means providing one or more "rider" streams of oil or other liquid immiscible with water onto or contiguous with the quenching jets or streams 116 of water, the "rider" streams being conveyed by or moving with the water streams or jets 116 into contact or engagement with the fibers or filaments of glass at the tips of the cones of glass at the attenuation region.

A supply container or reservoir 120 contains oil or other liquid immiscible with water or other quenching fluid, the oil adapted to contain particulate materials such as plastic, powders, metal particles or other comminuted materials which are conveyed or carried by the oil on surface regions of the quenching water streams or jets 116 into contact with the fibers or filaments at the attenuating region. Oil from a bulk supply is conveyed to the container 120 by a pipe or tubular member 122.

Means is provided for conveying oil or other liquid from the container 120 for delivery onto each of the quenching or water streams 116.

FIG. 7 illustrates two pipes or tubular members 124 and 126 extending into the oil 128 in the supply container 120. A pump or pumping means 130 is associated with the pipe 124 for pumping oil from the container to a nozzle 132 disposed above each water delivery nozzle 114, the terminus of each nozzle 132 being preferably adjacent the terminus of the adjacent water nozzle 114. The oil delivered from the nozzle 132 provides a "rider" stream or film 140 of oil on the upper region of a quenching or water jet 116 whereby the stream 116 of water conveys or directs the oil into contact with the fibers or filaments 108 as they are attenuated from the glass streams 18'.

A pump 136 is connected with pipe 126 for pumping oil from the supply container 120 to each nozzle 138 disposed adjacent and below each water delivery nozzle 114, each nozzle terminating adjacent the terminus of a water delivery nozzle 114. The pump 136 delivers a "rider" stream or film 142 of oil from each nozzle 138 in contiguous contact with and along the lower surface region of an adjacent water stream 116.

The pumps 130 and 136 deliver the oil from the nozzles 132 and 138 at about the same velocity of the quenching streams 116 of water so that the "rider" streams of oil move with the quenching streams 116. As the "rider" streams of oil are moving at substantially the same velocity as the water or fluid of the quenching streams, the velocity of the oil streams is sufficient to maintain the streams of oil as coherent streams at least until an oil stream has engaged or contacted all of the fibers or filaments of a transverse row.

While FIGS. 7 and 8 illustrate the use of two oil streams, one above and the other below each quenching stream of water, it is to be understood that a single oil stream may be used or more than two oil or "rider" streams may be used with each quenching stream 116.

The oil provides a carrier or vehicle for conveying particulate materials into contact with the glass streams at the region of attenuation of the glass streams into kinky fibers or filaments. The apparatus includes a container 144 or other means providing a supply of particulate material for delivery into the oil or other liquid 128 in the receptacle or container 120.

Connected with the supply receptacle 144 is a delivery chute or means 146 for conveying particulate materials 147 from the supply receptacle 144 into the container or chamber 120. A conventional gating means or control 148 is associated with the delivery chute 146 for controlling or regulating the rate of delivery of particulate materials from the supply receptacle 144 into the container 120.

Disposed in the container 120 is a means or instrumentality 149 for agitating or mixing the particulate materials and oil in the container 120 for dispersing and distributing the particulate materials throughout the oil 128. In the embodiment illustrated in FIG. 7, the mixing instrumentality includes an electrically energizable motor or motive means 150 which rotates a shaft 151 on which is mounted a vaned impeller or mixer 152. The speed of the motor 150 may be controlled whereby the impeller thoroughly mixes the particulate materials in the oil 128 in the container 120.

The apparatus illustrated in FIG. 7 includes an arrangement similar to that illustrated in FIGS. 2 and 4 for receiving the spent liquid of the quenching streams 116 and particulate materials remaining in the quenching streams. The arrangement of FIG. 7 includes means for recovering the water or liquid of the quenching streams for reuse as well as recovery of the oil and particulate materials remaining in the oil for reuse.

Disposed lengthwise of the stream feeder 10' is a hollow or tubular manifold 80'. Arranged lengthwise of the manifold 80' are tubular members 82' which are connected with vertically disposed tubular members 84', each of the members 84' having a funnel-shaped entrance means or member 87'.

The manifold 80' is connected with a suction blower 90' for connection with a filter means (not shown) for filtering out particulate materials that may escape from the oil of the "rider" streams 140 and 142. While only one of each of the members 82', 84' and 87' is illustrated in FIG. 7, it is to be understood that an assembly of such members connected with the manifold 80' is provided to receive each of the quenching streams 116 and the "rider" streams 140 and 142 of oil associated with each quenching stream.

The arrangement shown in FIG. 7 is inclusive of means for recovering and reusing the oil and quenching liquid or water. The tubular members 84' extend into a container or receptacle 156 which receives the water of the spent quenching streams 116 and the oil or other liquid of the "rider" streams 140 and 142. The water of the quenching streams collects in the lower region of the receptacle 156 and the oil floats or collects on the upper surface of the water in the receptacle.

A float member 158 floats upon or is buoyed up by the water in the receptacle 156. The float member 158 is connected by means of a flexible tube or tubular member 160 with a pump 162 which pumps the oil and any residual particulates therein from the receptacle 156 through a tube or tubular member 164 into the receptacle or container 120 for reuse in the system.

The lower region of the container 156 is connected by a pipe or tube 168 with a pump 170 which pumps water from the receptacle 156 to a pressure reservoir (not shown) for redelivery to the manifold 112 for reuse. The pump 170 may be connected with the manifold 112 to deliver the collected water direct to the manifold 112. Water from a conventional water supply system may be connected to the manifold 112 to compensate for water lost by evaporation.

Where particulate material 147, such as metals or carbon particles or the like, is supplied to the container 120 for delivery in the "rider" streams 140 and 142, an electric circuit 173 may be provided for effecting a coating or deposition of metal particles on the fibers or filaments or to effect micro arcs between adjacent metal particles or carbon particles to form a pitted or roughened surface on the fibers or filaments or for other purposes.

A positive terminal 172 of the circuit 173 is connected with each of the water delivery nozzles 114 and a negative terminal 174 of the circuit 173 may be connected with each of the funnel-shaped entrance members 87' whereby an electrical potential is established for the metal or carbon particles in the oil or "rider" streams 140 and 142.

Where the quenching streams contain particles of carbon, the electrical potential between adjacent carbon particles causes micro arcing tending to form pitted or roughened surfaces on the fibers or filaments. Where the particles are of metal, the current potential and the heat from the glass streams may fuse the metal particles to the glass to form a composite glass and metal fiber or filament. The metal particles may be rendered molten to form coatings on the glass fibers or filaments.

The electrical potential set up in the "rider" streams of oil is direct current preferably of a voltage of about twenty-four volts or more, the voltage being sufficient to cause micro arcs to occur between adjacent particles. Where it is desired to effect a fusing or coating of metal particles onto the fibers or filaments, the voltage may be increased. It is to be understood tht the voltage may be varied depending upon the reaction desired between the glass streams and the particles of metal.

The functioning or operation of the apparatus or arrangement illustrated in FIGS. 7 and 8 is as follows: Water or other quenching liquid under pressure in the manifold 112 provides coherent quenching streams 116 of sufficient velocity to cause the streams to move in substantially rectilinear paths into contact with the glass streams 18' flowing from the rows of transversely aligned orificed tips 16' on the bushing or feeder 10'. The quenching streams 116 quench the glass strams 18' into kinky or undulated fibers or filaments 110 as the fibers or filaments are attenuated by winding a strand of the fibers or filaments upon a collector or sleeve rotated by a collet such as the collet 32 illustrated in FIG. 1.

The container 120 is supplied with oil, a silicon coupling agent or other liquid immiscible with water from a supply (not shown) through a pipe 122. Particulate material 147 is provided from a supply receptacle 144, the particulate material being delivered by a trough or member 146 into the oil or other fluid in the container 120, the rate of flow of the particulate material into the container 120 being controlled by a gating means 148 or other suitable conventional control.

The motor 150 is energized to rotate the impeller or mixer 152 to thoroughly mix the particulate material or materials with the oil or other liquid in the container 120. The pumps 130 and 136 are energized and pump the mixture of oil or other liquid and particulate materials from the container 120 to the nozzles 132 and 138 adjacent the exit end regions of the water delivery nozzles 114. The nozzles 132 and 138 deliver "rider" streams 140 and 142 of the mixture of oil or other liquid and particulate material above and below the streams 116 of water or other quenching liquid.

The "rider" streams 140 and 142 of oil or other liquid and particulate materials are delivered by the pumps 130 and 136 along the quenching streams 116 at substantially the same velocity as that of the quenching streams 116. In this manner the "rider" streams move with the quenching streams 116 at substantially the same velocities so that there is a minimum of spreading of the liquid of the "rider" streams over the surfaces of the quenching streams 116.

The spent water of the quenching streams 116 and the residual liquid and particulate material of the "rider" streams are received by the funnel-shaped members 87' and conveyed by the tubular members 84' into the receptacle 156. The suction blower 90' conveys any loose residual particulates to a filter to prevent contamination of the atmosphere.

The oil or liquid coupling agent received in the receptacle 156 floats on the water contained in the receptacle 156, the oil being returned by a pump 162 into the container 120 through the tubular means 160. The water in the lower region of the receptacle 156 is returned by the pump 170 to the water pressure supply or reservoir for reuse for the quenching streams, or the water may be pumped directly to the manifold 112.

Plastic or resinous material in powdered form added to the oil for the "rider" streams may be utilized as a surface treatment for the glass fibers or filaments. Metals, such as tin, chromium, boron and the like, may be added to the liquid of the "rider" streams. With the use of metal powders in the "rider" streams, an electrical potential is provided through the circuitry 173 to provide micro arcs between adjacent metal particles in the "rider" stream whereby the arcs react to form roughened or nonsmooth surfaces on the kinky fibers or filaments 110, or the metal powder may be fused to the kinky fibers or filaments.

In addition, the "rider" streams may contain an exothermic material to intensify heat. For example, a powdered material marketed under the trademark "Thermit" being a composition containing in powder form, aluminum, an iron oxide and ferrosilicon, may be added to the "rider" streams to increase the heat at the region of the glass streams, such increase in heating being effective to fuse the metal onto the glass fibers or filaments. An endothermic material may be added to the "rider" stream to promote faster quenching of the glass streams.

Other particulate materials may be used in the "rider" streams 140 and 142 to secure reactions with the glass fibers or filaments or to provide other characteristics for the fibers or filaments. Particles of carbon may be used in the "rider" streams in conjunction with the electric current for securing micro arcing between adjacent carbon particles. However, when the "rider" streams contain particles of metal to secure pitted or roughened surfaces by micro arcing the use of carbon particles may be dispensed with.

FIG. 9 illustrates schematically the method involving feeding metal in strip, wire or other form, into the cones of glass at the tips of the orificed projections of a feeder to provide composite glass and metal fibers or filaments. FIG. 9 illustrates a feeder or bushing 178 having rows of orificed depending projections 180. Molten glass in the feeder flows through the orifices in the projections 180 providing cone-shaped regions 182 of glass streams 183.

The glass streams adjacent the tip regions of the cones 182 are engaged by quenching streams 185 of water or other quenching liquid which engage the glass streams adjacent the tip regions of the cones forming fibers or filaments 187 having kinks, bends or undulations therein resulting from the quenching of the glass streams by the streams 185 of water.

In the arrangement illustrated in FIG. 9, wires or strips of metal 189 are advanced into contact with the cones 182 of molten glass by suitable feeding means such as pairs of rolls 190. The wires or strips of metal 189 are advanced by the pairs of rolls 190 with the tips of the wires or strips engaging the cones, the heat from the cones of glass softening or melting the metal, the molten metal adhering to the hot glass.

The rolls 190 advance the metal wires or strips at the rate at which the metal is melted or fused by the hot glass whereby the metal and glass become a composite metal-glass fiber or filament. The metal joined with a glass fiber or filament 187 is shown at 189' in FIG. 10. In this manner, the metal component 189' of a fiber or filament 187 is a continuous linear body fused with the glass.

FIG. 11 illustrates a modified electrical circuit for conductive materials in the quenching or water streams where conductive metals or material, such as carbon particles, are present in the water or liquid of the quenching streams. In FIG. 11, the stream feeder or bushing 10a is provided with orificed projections 16a through which flow streams 18a of glass, the glass at the exits of the orificed projections being in the form of cones 20a.

Nozzles 50a connected with a manifold similar to the manifold 44 shown in FIG. 1 deliver quenching streams 52a of water which engage and quench the glass streams 18a at or adjacent the tips of the cones 20a as the glass streams are attenuated into fibers or filaments 192 having kinks, bends or undulations in the fibers or filaments established by engagement of the quenching streams with the glass streams. The water of the quenching streams 52a is delivered into funnel-shaped members 87a.

The circuit for the powdered metals or carbon particles in the water streams includes a positive terminal 194 connected to each of the nozzles 50a. A negative terminal 186 is connected to the funnel-shaped members 87a. An alternate negative terminal 196a is connected to the stream feeder or bushing 10a. A switch means 198 is incorporated in the circuit so that the current flow from the nozzles 50a may be through the water stream collecting funnel members 87a or alternately through the glass streams 18a to the bushing 10a.

In the use of either circuit wherein the quenching streams 52a contain metals in particulate form or carbon particles, the current potential promotes micro arcing between adjacent metal particles or adjacent carbon particles to effect a roughness or pitting of the surfaces of the kinky fibers or filaments. Various metals in particulate form may be used, such as tin, chromium, boron and the like, or compounds thereof may be contained in the quenching streams 52a.

FIG. 12 is similar to FIG. 11 illustrating a modified electric circuit involving the quenching streams. Glass streams 18b flowing from the feeder or bushing 10b through orificed projections 16b have cone formations 20b, the glass streams being attenuated to fibers or filaments 192b having kinks, bends or undulations in the fibers or filaments under the influence of the quenching streams 52b delivered from nozzles 50b.

A circuit is provided whereby current may flow through the quenching streams by reason of carbon particles or metals in particulate form added to the water of the quenching streams to react with the glass under the influence of current potential in the quenching streams.

The electric circuit includes a positive terminal 194b connected with each of the water delivery nozzles 50b and a negative terminal 196b connected with the members 87b, the latter receiving the spent water of the quenching streams. An alternative negative terminal 200 is connected with the stream feeder or bushing 10b.

When the current flow is through the quenching streams from terminal 194b to the terminal 196b, the materials in the quenching streams, such as carbon particles or metal particles, react with the fibers or filaments. When the alternate terminal 200 is used, a circuit is established with the terminal 194b and current flow is through the glass streams 18b and cones 20b of glass through the bushing 10b to promote various reactions of the metal particles with the fibers or filaments.

FIG. 13 illustrates an arrangement for electroplating kinky fibers or filaments with a metal. A stream feeder 10c has orificed projections 16c through which flow streams 18c of glass having the form of glass cones 20c depending from the tips of the projections 16c. Quenching streams 52c comprise an electrolyte or solution of a salt or compound of the metal to be deposited on the kinky fibers or filaments at the region of quenching and attenuation of the glass streams to form kinky fibers or filaments.

Disposed for alignment with transverse rows of glass streams 18c are nozzles 202, one of which is illustrated in FIG. 13. The nozzles are connected with a manifold 204. The manifold 204 is connected by a tubular means or member 206 with a pump 208, the latter being connected by a tubular means 210 with a container or receptable 212 containing a solution or electrolyte of a salt or compound of the metal to be deposited upon the kinky fibers or filaments 192c.

In the arrangement illustrated in FIG. 13, the manifold 204, the tubular members 206 and 210, the pump 208 and the container 212 are made of nonmetallic material, such as ceramic or the like, so that they will not be affected by the electrolyte or solution of the composition or metal salt of the metal to be deposited on the kinky fibers or filments 192c which solution forms the quenching streams 52c.

An electrode 216 is provided for each quenching stream 52c, the electrodes being of metal to be deposited upon the kinky fibers or filaments. Each electrode 216 extends through the manifold 204 and a nozzle 202 into a quenching stream 52c. Each of the electrodes extends through a sealing member 218 of nonmetallic material, the sealing members 218 being mounted in openings in the manifold 204 in alignment with the nozzles 202, the sealing members 218 being arranged to withstand the pressure of the liquid or solution providing the quenching streams 52c.

Each of the electrodes 216 is of the metal to be deposited upon the fibers or filaments. The electrodes 216 are connected by a current conductor 220 with a positive terminal of a source of direct current (not shown) and the stream feeder or bushing 10c connected by a conductor 222 with the negative terminal of the direct current supply.

The electrodes 216 form the anodes and the cones 20c of glass of the glass streams 18c form the cathodes. The electrodes 216 may be arranged to be fed or advanced through the sealing members 218 by conventional means as the metal of the electrodes is expended in forming the elecroplating on the kinky fibers or filaments. As an alternative, particles of the metal to be used for the plating may be delivered into the solution in the container 212.

The spent liquid of the quenching streams may be received in funnel-shaped collectors 87c and returned to the receptacle 212 for reuse. The funnel-shaped collectors 87c should be of nonmetallic material so that they will not be affected by the plating electrolyte or solution.

Most metals adaptable for electroplating may be used for coating or plating the kinky fibers or filaments. Examples of metals that may be used are nickel, chromium, tin, silver and cadmium. In the use of most metals, a salt of the metal may be used in the solution or electrolyte for the quenching streams. Where chromium is used as the plating metal, the electrolyte may be chromic acid solution.

In the electroplating method or process illustrated in FIG. 13, the pump 208 provides the pressure for delivering the quenching streams 52c from the nozzles 202. The current flow in the plating circuit is from the direct current supply through conductors 220 and electrodes 216 through the electorolyte or solution providing the quenching streams 52c, through the cones of glass 20c of the glass streams 18c, the stream feeder or bushing 10c and conductor 222 to the current supply.

It is apparent that, within the scope of the invention, modifications and different arrangements may be made other than as herein disclosed, and the present disclosure is illustrative merely, the invention comprehending all variations thereof.

I claim:

1. The method of forming fibers of heat-softened glass including flowing streams of glass in a row from a feeder, attenuating the streams of glass to fibers, impinging a coherent stream of liquid against the glass streams to effect successive distortions of the glass streams, conveying current-conducting material in particulate form in the stream of liquid, establishing electrical potential in the stream of liquid whereby the potential causes micro arcing between adjacent current-conducting particles to effect a modification of the surfaces of the attenuated fibers, and cooling the glass streams at the distortions by the stream of liquid to form successive permanent bends in the attenuated fibers.

2. The method of forming fibers of heat-softened glass including flowing streams of glass in a row from a feeder, attenuating the streams of glass to fibers, impinging a coherent stream of liquid against the glass streams to effect successive distortions of the glass streams, conveying metal in particulate form in the stream of liquid, establishing electrical potential in the stream of liquid whereby the potential causes micro arcing between adjacent metal particles to effect a modification of the surfaces of the attenuated fibers, and cooling the glass streams at the distortions by the stream of liquid to form successive permanent bends in the attenuated fibers.

3. The method of forming fibers of heat-softened glass including flowing streams of glass in a row from a feeder, attenuating the streams of glass to fibers, feeding metal in particulate form into a liquid, impinging a coherent stream of the liquid against the glass streams to effect successive distortions of the glass streams, conveying the metal in particulate form by the stream of liquid to the glass streams, establishing electrical potential in the stream of liquid whereby the potential effects microarcing between adjacent metal particles to react with the attenuated fibers, and cooling the glass streams at the distortions by the stream of liquid to form successive permanent bends in the attenuated fibers.

4. The method of forming fibers of heat-softened glass including flowing streams of glass in a row from a feeder, attenuating the streams of glass to fibers, feeding carbon in particulate form into a liquid, impinging a coherent stream of the liquid against the glass streams to effect successive distortions of the glass streams, conveying the carbon by the stream of liquid into contact with the glass streams, establishing electrical potential in the stream of liquid whereby the potential effects micro arcing between adjacent carbon particles to react with the attenuated fibers, and cooling the glass streams at the distortions by the stream of liquid to form successive permanent bends in the attenuated fibers.

5. The method of forming fibers of heat-softened glass including flowing streams of glass in a row from a feeder, attenuating the streams of glass to fibers, impinging a coherent stream of liquid against the glass streams to effect successive distortions of the glass streams, projecting a jet of a liquid immiscible with the liquid of the stream lengthwise of the stream and contiguous with the stream whereby the liquid of the jet contacts the streams of glass, feeding current-conducting material in particulate form into the liquid of the jet, establishing electrical potential in the stream of liquid and the jet of liquid whereby the potential effects micro-arcing between adjacent current-conducting particles in the liquid of the jet and adjacent the glass streams to effect a modification of the surfaces of the attenuated fibers, and cooling the glass streams at the distortions by the stream of liquid to form successive permanent bends in the attenuated fibers.

6. The method of forming fibers of heat-softened glass including flowing rows of streams of glass from a feeder, attenuating the streams of glass to fibers, impinging coherent streams of liquid against the glass streams, there being a coherent stream of liquid for each row of glass streams, the coherent streams of liquid effecting successive distortions of the glass streams, feeding material in particulate form at a controlled rate into the liquid of each of said coherent streams whereby the particulate material reacts with the glass streams to modify the character of the fibers attenuated from the glass streams, wherein the material in particulate form is current conducting, establishing electrical potential in the streams of liquid whereby the potential establishes micro-arcing between adjacent current-conducting particles to modify the character of the fibers attenuated from the glass streams and cooling the glass streams at the distortions by the streams of liquid at a rate to form successive permanent bends in the attenuated fibers.

7. The method of forming fibers of heat-softened glass including flowing streams of heat-softened glass in a row from a feeder, attenuating the streams of glass to fibers, impinging a coherent stream of liquid against the glass streams to effect successive distortions of the glass of the streams, the liquid of the stream being an electrolyte of a metal coating composition, establishing an electric circuit through the stream of electrolyte, the circuit including a conductor in the stream of electrolyte forming the anode and the glass of the streams forming the cathode, the anode being of plating metal whereby a plating of the metal is formed on the attenuated fibers, and cooling the glass streams at the distortions by the streams of liquid at a rate to form successive permanent bends in the fibers.

8. The method of forming fibers of heat-softened glass including flowing streams of heat-softened glass in a row from a feeder, attenuating the streams of glass to fibers, impinging a coherent stream of liquid against the glass streams to effect successive distortions of the glass of the streams, the liquid of the stream being an electrolyte of a metal coating composition, establishing an electric circuit through the stream of electrolyte, the circuit including a conductor in the stream of electrolyte forming the anode and the glass of the streams forming the cathode, supplying plating metal in association with the anode whereby current flow through the electrolyte establishes a plating of the metal on the attenuated fibers, and cooling the glass streams at the distortions by the stream of liquid at a rate to form successive permanent bends in the fibers.

9. Apparatus for forming fibers of heat-softened glass, in combination, a stream feeder having a floor, a plurality of rows of orifices in the feeder floor adapted to flow rows of streams of glass, means attenuating the streams of glass of fibers, nozzle means projecting a coherent stream of liquid for each row for engagement with the glass streams to effect successive distortions of the glass streams, each of said coherent streams of liquid conveying current-conducting material in particulate form to the regions of the glass streams, means establishing a circuit for electrical potential in the coherent streams of liquid, the electrical potential forming micro arcs between adjacent particulates of the current-conducting material to modify the characteristics of the attenuated fibers, and the streams of liquid cooling the glass streams at the distortions at a rate to form successive permanent bends in the fibers.

10. Apparatus for forming fibers of heat-softened glass, in combination, a stream feeder having a floor, a plurality of rows of orifices in the feeder floor adapted to flow rows of streams of glass, means attenuating the streams of glass to fibers, nozzle means projecting a coherent stream of liquid for each row for engagement with the glass streams to effect successive distortions of the glass streams, each of said coherent streams of liquid conveying current-conducting material in particulate form to the regions of the glass streams, means for receiving the spent liquid of the streams of liquid, means establishing a circuit for electrical potential in the coherent streams of liquid, said circuit means including a conductor connected with the nozzle means and a second conductor associated with the streams of liquid, the electrical potential forming micro arcs between adjacent particulates of the current-conducting material to modify the characteristics of the attenuated fibers, and cooling the glass streams at the distortions by the streams liquid at a rate to form successive permanent bend in the fibers.

11. Apparatus according to claim 10 wherein the second conductor associated with the streams of liquid is connected with the means for receiving the spent liquid of the streams.

12. Apparatus according to claim 10 wherein the second conductor associated with the streams of liquid is connected with the stream feeder.

13. Apparatus for forming fibers of heat-softened glass, in combination, a stream feeder having a floor, a plurality of rows of orifices in the feeder floor adapted to flow streams of glass, means attenuating the streams of glass to fibers, main nozzle means projecting a coherent stream of liquid for each row for engagement with the glass streams to effect successive distortions of the glass streams, second nozzle means adjacent each of the main nozzle means delivering a jet stream of liquid immiscible with the liquid of the coherent streams lengthwise of and in contiguous relation with each of the coherent streams of liquid for engagement with the glass streams, each of said jet streams of liquid containing current-conducting particulate material, circuit means for establishing electrical potential in the jet streams, the electrical potential forming micro arcs between adjacent current-conducting particulates to modify the surface characteristics of the attenuated fibers, and the streams of liquid cooling the glass streams at the distortions at a rate to form successive permanent bends in the fibers.

14. Apparatus for forming fibers of heat-softened glass, in combination, a stream feeder having a floor, a plurality of rows of orifices in the feeder floor adapted to flow streams of glass, means attenuating the streams of glass to fibers, first nozzle means projecting a coherent stream of liquid for each row for engagement with the glass streams to effect successive distortions of the glass streams, second nozzle means adjacent each of the first nozzle means delivering a jet stream of liquid immiscible with the liquid of the coherent streams lengthwise of and in contiguous relation with each of the coherent streams for engagement with the glass streams, each of said jet streams of liquid containing current-conducting material in particulate form, said jet streams conveying the current-conducting material to the regions of the glass streams, means for receiving the spent liquid of the coherent streams and the jet streams, means establishing a circuit for electrical potential in the coherent streams of liquid and the jet streams, said circuit means including a conductor connected with the nozzle means, a second conductor connected with the means receiving the spent liquids of the streams, the electrical potential forming micro arcs between adjacent particulates of the current-conducting material to modify the chacteristics of the attenuated fibers, and the liquid of the coherent streams cooling the glass streams at the distortions at a rate to form successive permanent bends in the fibers.

* * * * *

UNITED STATES PATENT AND TRADEMARK OFFICE
CERTIFICATE OF CORRECTION

PATENT NO. : 4,274,855
DATED : June 23, 1981
INVENTOR(S) : Robert G. Russell

It is certified that error appears in the above—identified patent and that said Letters Patent is hereby corrected as shown below:

Abstract, next to last line should read:

produced having roughened or pitted surfaces or im-

Column 6, line 18 should read:

end regions 56, 56a and 56b, connected with tubular

Column 6, line 19 should read:

members 58 which are of very small diameter approximat-

Column 7, line 17 should read:

a rotatable shaft 94 driven by an electric motor 95 or

Column 10, line 38 should read:

other liquid thereby forming successive kinks, bends or

Column 13, line 55 should read:

The quenching streams 116 quench the glass streams 18'

Column 15, line 55 should read:

terminal 196 is connected to the funnel-shaped members

Column 19, line 36 should read:

of glass to fibers, nozzle means projecting a coherent

UNITED STATES PATENT AND TRADEMARK OFFICE
CERTIFICATE OF CORRECTION

PATENT NO. : 4,274,855
DATED : June 23, 1981
INVENTOR(S) : Robert G. Russell

It is certified that error appears in the above—identified patent and that said Letters Patent is hereby corrected as shown below:

Column 20, line 5 should read:

streams of liquid at a rate to form successive permanent

Signed and Sealed this

Twenty-second Day of September 1981

[SEAL]

Attest:

GERALD J. MOSSINGHOFF

Attesting Officer        Commissioner of Patents and Trademarks